United States Patent [19]

Raynor

[11] 4,374,934
[45] Feb. 22, 1983

[54] SEMI-FLEXIBLE FOAM POLYMER USED IN PACKAGING

[75] Inventor: Robert J. Raynor, North Branford, Conn.

[73] Assignee: Olin Corporation, New Haven, Conn.

[21] Appl. No.: 248,166

[22] Filed: Mar. 30, 1981

[51] Int. Cl.³ .................. C08G 18/14; C08G 18/48
[52] U.S. Cl. .................. 521/112; 264/46.4; 264/46.5; 264/46.6; 521/129; 521/167; 521/174; 521/175; 521/904; 521/914
[58] Field of Search .............. 521/904, 167, 174, 175, 521/112, 129, 914

[56] References Cited

U.S. PATENT DOCUMENTS

| 2,897,641 | 8/1959 | Simon et al. ........................ 53/449 |
| 3,377,296 | 4/1968 | Dwyer et al. ...................... 521/174 |
| 3,424,700 | 1/1969 | Booth et al. ....................... 521/167 |
| 3,507,815 | 4/1970 | Bailey et al. ...................... 521/174 |
| 3,726,816 | 4/1973 | Fabris et al. ...................... 521/174 |
| 3,865,762 | 2/1975 | Repiquet et al. ................... 521/167 |
| 3,887,483 | 6/1975 | Morehouse ........................ 521/174 |
| 4,087,389 | 3/1978 | Coppola ........................ 260/2.5 AP |
| 4,087,389 | 5/1978 | Coppola ........................... 521/174 |

Primary Examiner—H. S. Cockeram
Attorney, Agent, or Firm—William A. Simons; Thomas P. O'Day

[57] ABSTRACT

A select, low density semi-flexible foam polymer composition is prepared from a very select reaction mixture which is characterized by a foaming agent which consists essentially of water and is substantially free of fluorinated hydrocarbon compounds, and a relatively low reaction mixture NCO/OH index of from about 20 to about 70. The foam polymer composition is particularly useful in packaging fragile or shock-sensitive objects.

9 Claims, No Drawings

SEMI-FLEXIBLE FOAM POLYMER USED IN PACKAGING

This invention relates to the art of packaging fragile or delicate objects; and, more particularly, to a foam polymer composition and to its use in packaging such objects.

Due to their fragile or shock-sensitive nature, numerous articles and materials require special protection when they are packaged for shipping or storage. This includes for example electronic instruments, delicate glassware, fragile antiques, shock-sensitive chemicals and so forth. Various ways and shock-absorbing materials have been taught in the art for packaging such items. A well-known practice is to employ a cellular, shock-absorbing plastic material, such as polystyrene or polyurethane foam, to encapsulate or support the fragile article within the confines of a rigid or semi-rigid box or enclosure. See for example U.S. Pat. Nos. 2,897,641, Re. 24,767, 3,190,422, 3,173,535, 3,415,364 and 3,750,871.

Polyurethane foams used in packaging applications commonly are prepared by reacting a polyether polyol with an organic polyisocyanate in the presence of a foaming agent and a reaction catalyst. Typically, the foaming agent which is employed in the reaction mixture is a fluorinated hydrocarbon compound; however, the use of fluorinated hydrocarbons for this purpose has been found to be undesirable for a variety of reasons. Open-cell foams are produced and the fluorinated hydrocarbons are expelled to the atmosphere, and this is believed to present environmental problems and to pose a potential health hazard. Also, since it is desired that packaging foams have a relatively low density, such as about 0.35-0.5 pound per cubic foot, relatively large amounts of fluorinated hydrocarbons must be used.

Other problems can be incurred during shipment and storage of systems containing fluorinated hydrocarbons. For example, if the system is stored in a sealed container, considerable pressure can be generated if the temperature of the system is raised above ambient temperature, such as to about 80°–135° F. On the other hand, if the container is allowed to remain open, a significant amount of the compounds may escape to the atmosphere.

In some applications, the reaction mixture may contain in addition to fluorinated hydrocarbons a proportion of water as a foaming agent. However, since fluorinated hydrocarbons and water are generally mutually immiscible, compatibility problems may be encountered. Moreover, it has been found that fluorinated hydrocarbons may decompose in the presence of water and amine catalysts, such as those used in polyurethane foam formulations, leading to deactivation of the catalysts.

Accordingly, there is a need in the art for a low density foam, particularly suitable for packaging utilities, which can be prepared from a reaction mixture that is substantially free of fluorinated hydrocarbon foaming agents.

Now, according to this invention, a novel semi-flexible foam polymer composition has been found which is especially useful for such packaging applications. The foam composition of the invention is of very low density and therefore relatively low cost, and it is characterized by desirable shock transmission properties. This foam polymer composition is prepared from a very select reaction mixture which is characterized by a foaming agent which consists essentially of water and is substantially free of fluorinated hydrocarbon compounds, and a relatively very low index.

More specifically, the reaction mixture from which the foam of the invention is prepared has an index of about 20 to about 70 and is comprised of the following ingredients:

(a) a polymeric polyisocyanate having an average functionality of about 2 to about 3.5;

(b) a polyether polyol having 2–4 hydroxy groups and a molecular weight from about 100 to about 7,000, the polyether polyol being employed in a proportion of about 10 to about 70 parts per every 100 parts by weight of total polyisocyanate in the reaction mixture;

(c) a foaming agent which consists essentially of water and is substantially free of fluorinated hydrocarbon compounds, the foaming agent being employed in a proportion of about 7 to about 30 parts per every 100 parts of total polyisocyanate in the reaction mixture;

(d) an amine catalyst; and (e) a silicon-based surfactant.

The term "index" as used throughout the specification and claims herein means a 100 multiple of the over-all ratio of NCO to OH groups in the reaction mixture; and it can be calculated using the conventional formula:

$$\text{Index} = \frac{(56,100)(\text{gm of polyisocyanate})}{\left[\left(\begin{array}{c}\text{Hydroxyl No.}\\\text{of polyol}\end{array}\right)\left(\begin{array}{c}\text{gm of}\\\text{polyol}\end{array}\right)\right]\left(\begin{array}{c}\text{amine equivalent}\\\text{of polyisocyanate}\end{array}\right)}$$

In calculating an over-all index for a reaction mixture including water and one or more polyols, the bracketed quantity in the denominator of the above formula becomes the sum of the products of the hydroxyl number of water and each respective polyol multiplied by its respective weight in grams.

Surprisingly, it has been discovered that by using the very select reaction mixture of the invention, a low density foam polymer having properties desirable for packaging applications can be made without the use of a foaming agent which contains a fluorinated hydrocarbon compound. This discovery was unexpected, for it is conventional in the art to employ such compounds in making low density foams for packaging articles requiring low density cellular materials.

According to the method of the invention, the reaction mixture comprises a polymeric polyisocyanate. Any such material, as conventionally used in polyurethane foam production, may be employed, including mixtures containing one or more polymeric polyisocyanates. Illustrative such materials are described in U.S. Pat. Nos. 2,638,730 which issued on July 13, 1954 to Seager et al., and 3,341,463 which issued on Sept. 12, 1967 to Gemeinhardt. The entire disclosures of these two patents are incorporated herein by reference.

Typical polymeric polyisocyanates are mixtures of polyisocyanates represented by formula I below wherein n is a number from 0 to 5 and R is hydrogen or lower alkyl (i.e., 1–4 carbons):

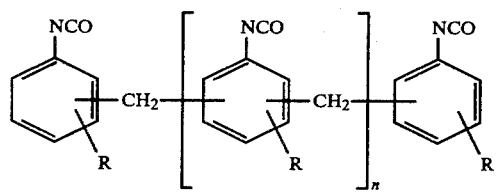

(I)

The preferred polymeric polyisocyanates are the polymethylene polyphenylisocyanates such as can be purchased commercially for use in polyurethane foam production. These are mixtures containing one or more polyisocyanates as represented by formula I above wherein R is hydrogen. Especially preferred polymethylene polyphenylisocyanates are those which have an average NCO functionality ranging from about 2 to about 3.5, more preferably from about 2.2–3.0 and still more preferably from about 2.4–2.8. It is to be understood that, as used in the specification and claims herein, the terms "polymeric polyisocyanate" and "polymethylene polyphenylisocyanate" are intended to include mixtures containing one or more such polyisocyanates. Further details concerning these compositions and their preparation are provided in the above-noted Seager et al. and Gemeinhardt patents.

Pursuant to the method of the invention, there is included in the foam-forming reaction mixture a polyol selected from a select group of polyether polyols having 2–4, and preferably 2–3, hydroxy groups and a molecular weight from about 100 to about 7,000. In accordance with the conventional method for converting molecular weight to hydroxyl number, this molecular weight range corresponds to a hydroxyl number range of about 1,122–16 in the case of the difunctional polyols and about 1,683–24 in the case of the trifunctional polyols.

The polyether polyol can be prepared by oxyalkylation techniques well known in the art. For example, it can be prepared by condensing, in the presence of an alkaline catalyst such as potassium hydroxide, an aliphatic diol, triol or mixture thereof with an alkylene oxide having 2–4 carbon atoms or with a mixture of such oxides using random or stepwise oxyalkylation techniques. Illustrative of such oxides are ethylene oxide, propylene oxide and butylene oxide. Exemplification of the diols and triols which are used in preparing the polyol are ethylene glycol, propylene glycol, the butylene glycols, glycerol, trimethylolpropane, triethylolpropane, mixtures thereof and the like.

In accordance with a preferred embodiment of the invention, the polyol is prepared using, as the oxyalkylating agent, propylene oxide followed by, i.e. capped with, ethylene oxide. Pursuant to this embodiment, the polyol is an oxypropylated then oxyethylated diol or triol, the triol being preferred.

In preparing the polyether polyol, the oxyalkylation reaction is allowed to proceed until the desired molecular weight is reached, at which time the reaction is terminated and the resulting polyol is recovered. As noted above, the molecular weight of the resulting polyol may range from about 100 to about 7,000; preferably, the polyol has a molecular weight of about 500–3,000. In accordance with the most preferred embodiments of the invention, a polyol as described above is used which has a molecular weight of about 800–2,000.

Usually a proportion of polyether polyol is used ranging from about 10 to about 70, and preferably about 20–50, parts per every 100 parts by weight of total polyisocyanate in the foam-forming reaction mixture.

In accordance with an especially preferred embodiment of the invention, two polyols are used: namely, a polyether polyol as described above and a supplemental polyol. Pursuant to this embodiment of the invention, the supplemental polyol is included to further stabilize the reaction mixture against pre-cure shrinkage or collapse and/or to further improve its water retention. Any suitable proportion of this supplemental polyol may be used which is effective in achieving these objectives. Illustratively, the supplemental polyol is used in a proportion of about 0.5–35, and more preferably about 5–20, parts per every 100 parts by weight of total polyisocyanate in the foam-forming reaction mixture.

As with the polyether polyol reactant as described above, the supplemental polyol which is employed can be prepared by prior art oxyalkylation techniques. For example, it can be prepared by condensing, in the presence of an oxyalkylation catalyst, a polyhydroxy initiator with an alkylene oxide having 2–4 carbon atoms or with a mixture of such oxides using random or stepwise oxyalkylation techniques. Illustrative of such alkylene oxides are ethylene oxide, propylene oxide and butylene oxide. The preferred alkylene oxides are ethylene oxide, propylene oxide and mixtures thereof.

Any polyhydroxy initiator having an average of 3–8, and preferably 4–6, OH groups may be employed in preparing the supplemental polyol. This includes for example glycerin, trimethylolpropane, triethylolpropane, sorbitol, pentaerythritol, sucrose, dextrose, methyl glucoside, the alkanolamines, such as diethanolamine and triethanolamine, and mixtures of these initiators. The use of a mixture of initiators is preferred according to the invention, particularly mixtures of sucrose with an alkanolamine and/or an aliphatic triol. The most preferred initiator mixture is one comprised of sucrose and an alkanolamine such as diethanolamine or triethanolamine.

The oxyalkylation reaction is performed using prior art oxyalkylation techniques until a polyether polyol is obtained having a hydroxyl number of about 300–700 and preferably about 400–600.

The foaming agent consists essentially of water and is employed in a relatively high level; the high level of water is required in order to achieve the low density requirements and to prevent foam shrinkage. Thus, water is employed in a proportion ranging from about 7 to about 30, and preferably about 12–20, parts per every 100 parts by weight of total polyisocyanate in the foam-forming reaction mixture.

The foam-forming reaction mixture also includes an amine catalyst or a mixture of such catalysts. Any such material may be used which is an effective catalyst for foam production. Typical are the tertiary amines of which the following are illustrative: trimethylamine, triethylene diamine, tetramethylene diamine, tetramethylbutane diamine, N-methylmorpholine, N-ethylmorpholine, dimethylpiperazine, trimethylaminoethylpiperazine, dimethylcyclohexylamine, bis(dimethylaminoethylether), methyldicyclohexylamine, N-cyclohexylmorpholine, methyldiethanolamine, dimethylethanolamine, trimethylaminoethylethanolamine, and N,N-bis(2-hydroxypropyl)-N',N'-dimethyl-1,3-propanediamine. The diamine is employed in catalytic proportions, i.e., proportions that are sufficient to catalyze the foam-forming reaction. Illustratively, such proportions may vary, depending on the particular catalyst used, from a low of about 0.4 to a high of about 12 parts per every 100 parts by weight of total polyisocyanate in the reaction mixture.

The foam-forming reaction is effected in the presence of a silicon-based surfactant which is necessary in order to prevent the foam from collapsing and further to obtain a foam having a uniform and acceptable cellular structure. For this purpose, any of the conventionally used silicon-based surfactants, such as the siloxane oxyalkylene block copolymers, may be employed. Generally, however, it is preferred to employ a silicon-based surfactant that is non-hydrolyzable. Such surfactants are characterized by silicon-carbon linkages that are stable in water or water-containing pre-mixes. This stability is predicated on the absence of Si—O—C bonds in the molecule. Representative such surfactants are the non-hydrolyzable silicon-glycol copolymers which are described in the *Journal of Cellular Plastics*, March/April, 1973 issue, pp. 99–102; and the siloxane-polyether urethane copolymers, described in U.S. Pat. No. 3,246,048 which issued on Apr. 12, 1966 to Haluska. The entire disclosures of both these references are incorporated herein by reference.

The silicon-based surfactant is generally employed in a proportion from about 0.2 to about 8, and more preferably about 0.4–4, parts per every 100 parts by weight of total polyisocyanate in the reaction mixture. This is in order to prevent the foam from collapsing, when too little surfactant is used, and also to avoid foam shrinkage when too high a level of the surfactant is used.

In addition to the above-described ingredients, the foam-forming reaction mixture may include other additives which serve a certain function or impart certain properties to the foam. This includes for example colorants, flame retardant additives and so forth.

The foam-forming mixture of the invention is particularly suited for the on-site generation of foam by means of portable foaming apparatus. Illustrative such apparatus are disclosed in U.S. Pat. Nos. 3,769,232, which issued on Oct. 30, 1973 to Houldridge, and 3,541,023, which issued on Nov. 17, 1970 to Cole. The entire disclosures of both these patents are incorporated herein by reference.

Foams prepared according to the invention are semi-flexible and substantially open-cell. They are further characterized by a combination of very low density, about 0.35 to about 1.0, and preferably about 0.35–0.5, pound per cubic foot, and low shock-transmission properties as determined by the test described in ASTM-D-1596. As such, the foams of the invention are highly suitable, from a practical and economic standpoint, for use in packaging fragile or shock-sensitive articles and materials.

In utilizing these foams for packaging fragile articles pursuant to the method of the invention, any suitable prior art technique may be used. For example, the fragile article may be first placed or suspended inside a cardboard or wooden box, and the space between the article and the interior walls of the box then filled with the foam. Another technique is to prepare pre-molded sections of foam which are then used to enclose the fragile article. Various other methods of packaging may be used as described or practiced in the art. Thus the improved foam formulation disclosed herein may be used in the practice of any prior art method for packaging fragile articles.

The following examples are provided to illustrate the invention. Further in the examples, all parts are by weight based on 100 parts by weight of total polyisocyanate in the reaction mixture.

EXAMPLES 1–4

Semi-flexible foam polymers were prepared from reaction mixtures utilizing the ingredients and proportions as outlined in Table I. In each example, the ingredients were hand-mixed and foamed in a square cardboard box. Foam products were obtained and were observed for shrinkage or collapse during room temperature curing; and the core density for each product was measured.

In each example, the foaming reaction took place instantly and was completed shortly thereafter. Uniform, substantially open-cell semi-flexible cellular products which exhibited no collapse or shrinkage were obtained.

TABLE I

|  | Example 1 | Example 2 | Example 3 | Example 4 |
|---|---|---|---|---|
| Polymethylene polyphenylisocyanate 1 | 100.00 | 100.00 | 100.00 | 100.00 |
| Polyether polyol 2 | 32.9 | 34.11 | 13.23 | 20.76 |
| Water | 15.18 | 15.27 | 13.23 | 13.97 |
| Trimethylaminoethylethanolamine catalyst 3 | 2.54 | — | — | — |
| Trimethylaminoethanolamine catalyst 4 | — | 1.53 | 2.86 | 3.02 |
| Dow Corning ® 191 surfactant 5 | 1.21 | — | 3.30 | — |
| Silicon-based surfactant 6 | — | 1.83 | — | 2.04 |
| Cream, sec. | 7 | 7 | 7 | 8 |
| Rise, sec. | 31 | 31 | 20 | 14 |
| Cell size | Medium | Medium | Fine | Medium |
| Density, core, p.c.f. | 0.40 | 0.40 | 0.35 | 0.39 |
| Shrinkage | None | None | None | Trace |

1 This is a commercial product of Uniroyal Chemical Div. of Uniroyal Inc. purchased under the trademark "Rubinate-m" and having an approximate functionality of 2.7.
2 This is a polyether triol having a molecular weight of 1,400 and which is the product of condensing glycerin first with 15.6 moles of propylene oxide and then with 9 moles of ethylene oxide.
3 This is a commercial product of Abbott Laboratories purchased under the trademark "Polycat-15".
4 This is a commercial product of Air Products and Chemicals Inc. purchased under the trademark "Dabco-t".
5 This is a silicone-glycol copolymer described in a 1977 Dow Corning bulletin, No. 22-476-77.
6 This surfactant is a silicone glycol copolymer having no Si—O—C bonds in the molecule. It is a product of Union Carbide sold under the designation or trademark "L-550".

EXAMPLES 5–11

Semi-flexible foam polymers were prepared from reaction mixtures utilizing the ingredients and proportions as outlined in Table II. In each example, the ingredients were hand-mixed and foamed in a square cardboard box. Foam products were obtained and were observed for shrinkage or collapse during room temperature curing; and the core density for each product was measured.

In each example, the foaming reaction took place instantly and was completed shortly thereafter. Uniform, substantially open-cell semi-flexible cellular products which exhibited no collapse or shrinkage were obtained.

TABLE II

|  | Example 5 | Example 6 | Example 7 | Example 8 | Example 9 | Example 10 | Example 11 |
|---|---|---|---|---|---|---|---|
| Polymethylene polyphenylisocyanate 1 | 100.00 | 100.00 | 100.00 | 100.00 | 100.00 | 100.00 | 100.00 |
| Polyether polyol 2 | 26.02 | 54.15 | 41.71 | 44.70 | 17.52 | 36.45 | 43.40 |
| Supplemental polyol 3 | 8.69 | 17.78 | 20.77 | 14.89 | 5.84 | 29.48 | 35.51 |
| Water | 15.05 | 7.44 | 24.23 | 21.16 | 15.17 | 29.09 | 8.96 |
| Trimethylaminoethanolamine catalyst 4 | 1.27 | 1.45 | 1.29 | 1.44 | 1.21 | 1.94 | 1.80 |
| Silicon-based surfactant 5 | 2.04 | — | 2.36 | 2.77 | 1.99 | 1.18 | — |
| Silicon-based surfactant 6 | — | 1.00 | — | — | — | 2.0 | 0.89 |
| Tris ($\beta$-chloropropyl) phosphate 7 | — | — | — | — | — | 15.02 | 11.22 |
| Tetrakis (2-chloroethyl) ethylene diphosphate 8 | — | — | — | — | 11.54 | — | — |
| Cream, sec. | 8 | 8 | 11 | 10 | 8 | 7 | 5 |
| Rise, sec. | 30 | 36 | 35 | 40 | 32 | 32 | 26 |
| Cell size | Medium | Medium Fine | Fine | Medium | Medium | Medium | Medium |
| Density, core, p.c.f. | 0.40 | 0.96 | 0.44 | 0.47 | 0.40 | 0.60 | 1.0 |
| Shrinkage | None | None | None | None | None | None | None |

1 This is a commercial product of Uniroyal Chemical Div. of Uniroyal Inc. purchased under the trademark "Rubinate-m" and having an approximate functionality of 2.7.
2 This is a polyether triol having a molecular weight of 1,400 and which is the product of condensing glycerin first with 15.6 moles of propylene oxide and then with 9 moles of ethylene oxide.
3 This is a polyether polyol having a molecular weight of 434 and which is the product of condensing a 1/3.56 molar mixture of sucrose/diethanolamine first with 6.84 moles of propylene oxide and then with 1 mole of ethylene oxide.
4 This is a commercial product of Air Products and Chemicals Inc. purchased under the trademark "Dabco-t".
5 This surfactant is a silicone glycol copolymer having no Si—O—C bonds in the molecule. It is a product of Union Carbide sold under the designation or trademark "L-550".
6 This surfactant is a silicone glycol copolymer having no Si—O—C bonds in the molecule. It is a product of Union Carbide sold under the designation or trademark "L-540".
7 This is a commercial product of Stauffer Chemical Company commercially available under the trademark "Fyrol-pcf".
8 This is a commercial product of Olin Corporation commercially available under the trademark Thermolin® 101.

EXAMPLES 12 AND 13

Semi-flexible foam polymers were prepared using the procedure of Examples 1-11. The formulations employed in Examples 12 and 13 were identical to those of Examples 2 and 5, respectively. The products were then tested in accordance with the procedure in ASTM-D-1596. The results, which are summarized in Table III, show that the foam polymers had excellent shock-absorbing characteristics, particularly for use with fragile or light objects.

TABLE III

| SHOCK-ABSORBING CHARACTERISTICS | | |
|---|---|---|
|  | Peak Acceleration, G's | |
| Static Stress, psi | Example 12 | Example 13 |
| 0.1 | 25.53 | 26.67 |
| 0.2 | 21.93 | 22.60 |
| 0.4 | 21.11 | 20.85 |
| 0.6 | 12.59 | 14.07 |
| 0.8 | 19.27 | 18.47 |

Note:
(1)The test samples utilized had thicknesses of 2 inches.
(2)In the testing, drops of 30 inches were performed.

What is claimed is:

1. A semi-flexible foam polymer having a density of from about 0.35 to about 1 pound per cubic foot, said polymer being prepared from a reaction mixture having an over-all index of about 20 to about 70, wherein said reaction mixture comprises:
   (a) a polymeric polyisocyanate having an average functionality of about 2 to about 3.5;
   (b) a polyether polyol having 2-4 hydroxy groups and a molecular weight from about 500 to about 3,000, said polyether polyol being employed in a proportion of about 10 to about 70 parts per every 100 parts by weight of total polyisocyanate in said reaction mixture;
   (c) a foaming agent which consists essentially of water and is substantially free of fluorinated hydrocarbon compounds, said foaming agent being employed in a proportion of about 7 to about 30 parts per every 100 parts of total polyisocyanate in said reaction mixture;
   (d) an amine catalyst; and
   (e) a silicon-based surfactant.

2. The semi-flexible foam polymer of claim 1, wherein said reaction mixture further comprises a supplemental polyol having 3-8 hydroxy groups and a hydroxyl number of about 300-700.

3. The semi-flexible foam polymer of claim 1, wherein said polyether polyol is an oxypropylated then oxyethylated diol or triol.

4. The semi-flexible foam polymer of claim 1, wherein:
   (a) said polyether polyol is an oxypropylated then oxyethylated triol; and
   (b) said amine catalyst is a tertiary amine.

5. The semi-flexible foam polymer of claim 4, wherein per every 100 parts by weight of total polyisocyanate in said reaction mixture, there are employed:
   (a) about 20 to about 50 parts of said polyether polyol;
   (b) about 12 to about 20 parts of said foaming agent; and
   (c) about 0.2 to about 8 parts of said silicon-based surfactant.

6. The semi-flexible foam polymer of claim 5, wherein said reaction mixture further comprises a supplemental polyol having 4-6 hydroxy groups and a hydroxyl number of about 400-600.

7. The semi-flexible foam polymer of claim 6, wherein said polymeric polyisocyanate is polymethylene polyphenylisocyanate and has a functionality of about 2.2–3.0.

8. A semi-flexible foam polymer having a density of from about 0.35 to about 0.5 pound per cubic foot, said polymer being prepared from a reaction mixture having an over-all index of about 30 to about 50, wherein reaction mixture comprises:
(a) polymethylene polyphenylisocyanate having a functionality of about 2.4–2.8;
(b) an oxypropylated then oxyethylated triol having a molecular weight of about 800–2,000, said triol being employed in a proportion of about 20 to about 50 parts per every 100 parts by weight of total polyisocyanate in said reaction mixture;
(c) a foaming agent which consists essentially of water and is substantially free of fluorinated hydrocarbon compounds, said foaming agent being employed in a proportion of about 12 to about 20 parts per every 100 parts by weight of total polyisocyanate in said reaction mixture;
(d) a catalytic proportion of a tertiary amine catalyst; and
(e) a non-hydroxyzable silicon-based surfactant in a proportion of about 0.4 to about 4 parts per every 100 parts by weight of total polyisocyanate in said reaction mixture.

9. The semi-flexible foam polymer of claim 8, wherein said reaction mixture further comprises a supplemental polyol having a hydroxyl number of about 400–600 and which is the product of reacting alkylene oxide having 2–4 carbon atoms with a mixture of sucrose and an alkanolamine.

* * * * *